(12) United States Patent
Adams et al.

(10) Patent No.: US 8,200,442 B2
(45) Date of Patent: Jun. 12, 2012

(54) USAGE MONITOR RELIABILITY FACTOR USING AN ADVANCED FATIGUE RELIABILITY ASSESSMENT MODEL

(75) Inventors: David O. Adams, Stratford, CT (US); Jack Z. Zhao, Woodbridge, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 347 days.

(21) Appl. No.: 12/566,743

(22) Filed: Sep. 25, 2009

(65) Prior Publication Data

US 2010/0235108 A1 Sep. 16, 2010

Related U.S. Application Data

(60) Provisional application No. 61/210,229, filed on Mar. 16, 2009.

(51) Int. Cl.
*G06F 19/00* (2011.01)
(52) U.S. Cl. .............................................. 702/34
(58) Field of Classification Search ............ 702/34, 702/185; 701/29, 31, 29.1
See application file for complete search history.

(56) References Cited

U.S. PATENT DOCUMENTS

| | | | |
|---|---|---|---|
| 5,109,700 A | 5/1992 | Hicho | |
| 5,195,046 A | 3/1993 | Gerardi et al. | |
| 5,383,133 A | 1/1995 | Staple | |
| 5,852,793 A | 12/1998 | Board et al. | |
| 6,176,136 B1 | 1/2001 | Zoppitelli et al. | |
| 6,226,597 B1 * | 5/2001 | Eastman et al. | 702/34 |
| 6,278,920 B1 * | 8/2001 | Hebberd | 701/29 |
| 6,693,548 B2 | 2/2004 | Boyce et al. | |
| 6,768,312 B2 | 7/2004 | Sun et al. | |
| 6,772,074 B2 | 8/2004 | Millott et al. | |
| 7,103,507 B2 | 9/2006 | Gorinevsky et al. | |
| 7,318,007 B2 | 1/2008 | Barkhoudarian | |

OTHER PUBLICATIONS

Condition Based Maintenance Technology Project Final Report, 2006 and 2007, Jack Zhao, Center for Rotorcraft Innovation, Inc.
"Searching for the Usage Monitor Reliability Factor Using an Advanced Fatigue Reliability Assessment Model," D.O. Adams, Jack Zhao, Copyright 2009—American Helicopter Society International, Inc.
"Inverse Reliability Problem," Armen Der Kiureghian, To appear in J. Eng. Mech., ASCE, 1994.
"A Computational Method for the Determination of Structural Reliability of Helicopter Dynamic Components," Audbur E. Thompson and David O. Adams, Presented at the American Helicopter society Annual Forum, May 1990.

* cited by examiner

*Primary Examiner* — Bryan Bui
(74) *Attorney, Agent, or Firm* — Carlson, Gaskey & Olds, P.C.

(57) ABSTRACT

According to one non-limiting embodiment, a method includes accessing flight regime rates of occurrence distributions associated with one or more flight regimes for a fleet of aircraft. Using the accessed flight regime distributions, a factor for at least one of the flight regimes is determined that provides a predetermined amount of reliability for a component on each aircraft on the fleet of aircraft known to be affected through at least fatigue damage by the at least one flight regime.

27 Claims, 7 Drawing Sheets

USAGE MONITOR RELIABILITY FACTOR USING AN ADVANCED FATIGUE RELIABILITY ASSESSMENT MODEL

RELATED APPLICATION

This application claims priority to U.S. Provisional Application No. 61/210,229 which was filed on Mar. 16, 2009.

BACKGROUND

The present disclosure relates to a Structural Usage Monitoring system, and more particularly to a Structural Usage Monitoring system incorporating a Usage Monitoring Reliability Factor.

Structural health predictions are used to determine when to replace various aircraft components. However, to achieve reliability requirements some of these estimates have been excessively conservative such that aircraft components are being replaced while still having a usable lifespan.

SUMMARY

According to one non-limiting embodiment, a method includes accessing flight regime rates of occurrence distributions associated with one or more flight regimes for a fleet of aircraft. Using the accessed flight regime distributions, a factor for at least one of the flight regimes is determined that provides a predetermined amount of reliability for a component on each aircraft on the fleet of aircraft known to be affected through at least fatigue damage by the at least one flight regime.

According to one non-limiting embodiment, an apparatus includes a computer configured through computer readable instructions to perform the operation of determining a fatigue reliability of an aircraft component in response to at least one of flight usage data, flight load data, historical data, and a fatigue reliability assessment model. The computer is also configured to perform the operation determining, using accessed usage distributions, a factor for at least one of the flight regimes that provides a usage count adjustment for the component for each aircraft of a fleet known to be affected through at least fatigue damage by the at least one flight regime.

According to one non-limiting embodiment, a method performed by a computer either on-board an aircraft remote from an aircraft includes receiving a usage monitoring reliability factor associated with a component on an aircraft, multiplying aircraft usage cycles by the factor to determine adjusted usage data, using at least the factor to adjust a lifetime of the component in response to the adjusted usage data, and displaying the adjusted lifetime of the component.

These and other features can be best understood from the following specification and drawings, the following of which is a brief description.

DETAILED DESCRIPTION

The Conventional Damage Calculation Reliability

One way to evaluate the basic reliability provided by a conventional safe-life damage calculation provided for a structural reliability goal of a component, such as an aircraft component, is the "6-9's" for each component. In the "6-9's" framework, each "9" represents a factor of 10 in reliability. "1-9" indicates 90% reliability and 10% failure. "2-9's" indicates 99% reliability and 1% failure. "3-9's" indicates 99.9% reliability and 0.1% failure. Thus, "6-9's" indicates that no more than 1 component in a million will fail in service prior to its fixed retirement time (99.9999% success and 0.00001% failure). This can only be a calculation goal or estimate because the statistical distribution shapes at the very low probabilities involved cannot be physically verified.

One way to approximate achievement of a "6-9's" goal is to obtain "3-9's" from fatigue strength of a structure; obtain "2-9's" from loads applied to the structure; and obtain "1-9" from usage (i.e. how often the loads are applied to the structure). This corresponds to a "3-sigma" fatigue strength working curve margin ("3-9's"), a "high-envelope" treatment of flight loads ("2-9's"), and a "worst case" assumption on usage ("1-9"). Each provides a contribution to the overall reliability ("6-9's"). Although usage may have the smallest effect of the three factors, but it is also the most unknown of the three.

The conclusion that conventional retirement times have approximately 6-9's reliability applies when the strength, loads, and usage distribution assumptions made for the original substantiation are not violated. However, actual fatigue failures in service are necessarily related to unknowable or unpredictable deviations from these assumptions that may resist the assignment of statistical characterizations in advance. Statistical study of fatigue is valuable, in that such study is the only means to understand and evaluate the relative contributions of each element and attribute of the fatigue substantiation process.

Assumed vs. Actual Usage

Figures 1, 2:
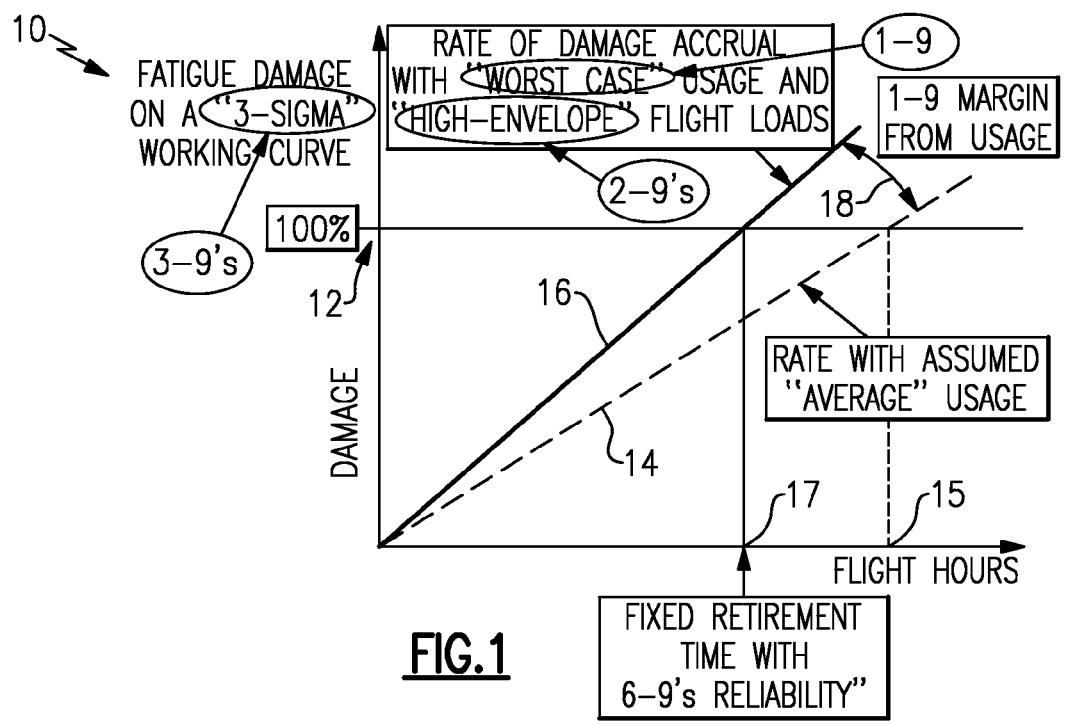
FIG. 1 is a graph that illustrates how cumulative fatigue damage based on a "3-Sigma" working curve varies between a worst case usage and an assumed average usage.
FIG. 2 is a graph that illustrates how usage monitor counts can be directly substituted for a worst case usage to prolong a retirement time for a component.

FIG. 1 is a graph 10 that illustrates how cumulative fatigue damage based on a "3-Sigma" working curve (see indicator 12) varies between a worst case usage 16 and an assumed average usage 14. At a damage level of 100% (see indicator 12) a structure (e.g. vehicle part) is assumed to have sustained a maximum amount of acceptable damage, and the part is retired. Thus, indicator 12 refers to cumulative damage indicating 100% "retirement time" of the part being achieved. Line 14 indicates an assumed "average" usage for a structure, which is an assumed trajectory at which damage would occur, resulting in a 100% damage retirement time occurring at time 15.

Line 16 indicates a "worse case" or "composite worst case" ("CWC") usage spectrum used to calculate a fixed retirement time. Using the example of a helicopter, this means that each critical line item in a spectrum maneuver list (i.e. a list of all flight regimes that occur during a flight) contains the highest rate of occurrence for that specific item that can occur in service for any mission or usage scenario anticipated for the subject helicopter. A flight regime is a predicted maneuver that may be performed during a flight (e.g. 30° turn, landing, etc.). This CWC assumption results in a mission that cannot be flown, that is, it is impossible to fly all of those turns, all of those climbs, all of those autorotations, all of those dives, all of those landings, and all of that high speed cruise in the same flight. The CWC assumes that these high rates occur for every maneuver in every flight in service for the life of the component. The CWC 100% damage is reached at time 17, which results in a margin 18 between the lines 14, 16.

For safety and reliability, a helicopter part is retired according to the CWC assumption despite the actual part possibly not having reached 100% damage. Although this may seem overly conservative, the CWC assumption protects against failure when only one or two line items in the spectrum dominate the component's damage calculation, and enables one to achieve a 6-9's reliability goal by introducing the margin 18. Outside of the CWC, actual usage data has not been used to predict structural lifetime.

FIG. 2 illustrates how usage monitor counts 20, 22, 24 can be directly substituted for the worst case usage 16 to prolong a retirement time for a part. However, simply using usage profiles 20-24 eliminates the margin 18 that provides one of the 9's of the 6-9's. Although one could argue that having an actual usage record removes a major unknown from the life calculation, a statistical analysis will demonstrate that a direct usage monitor retirement time has only the approximately 5-9's of structural reliability provided by the loads and strength margins.

Adding Back the Nine

Figure 3:
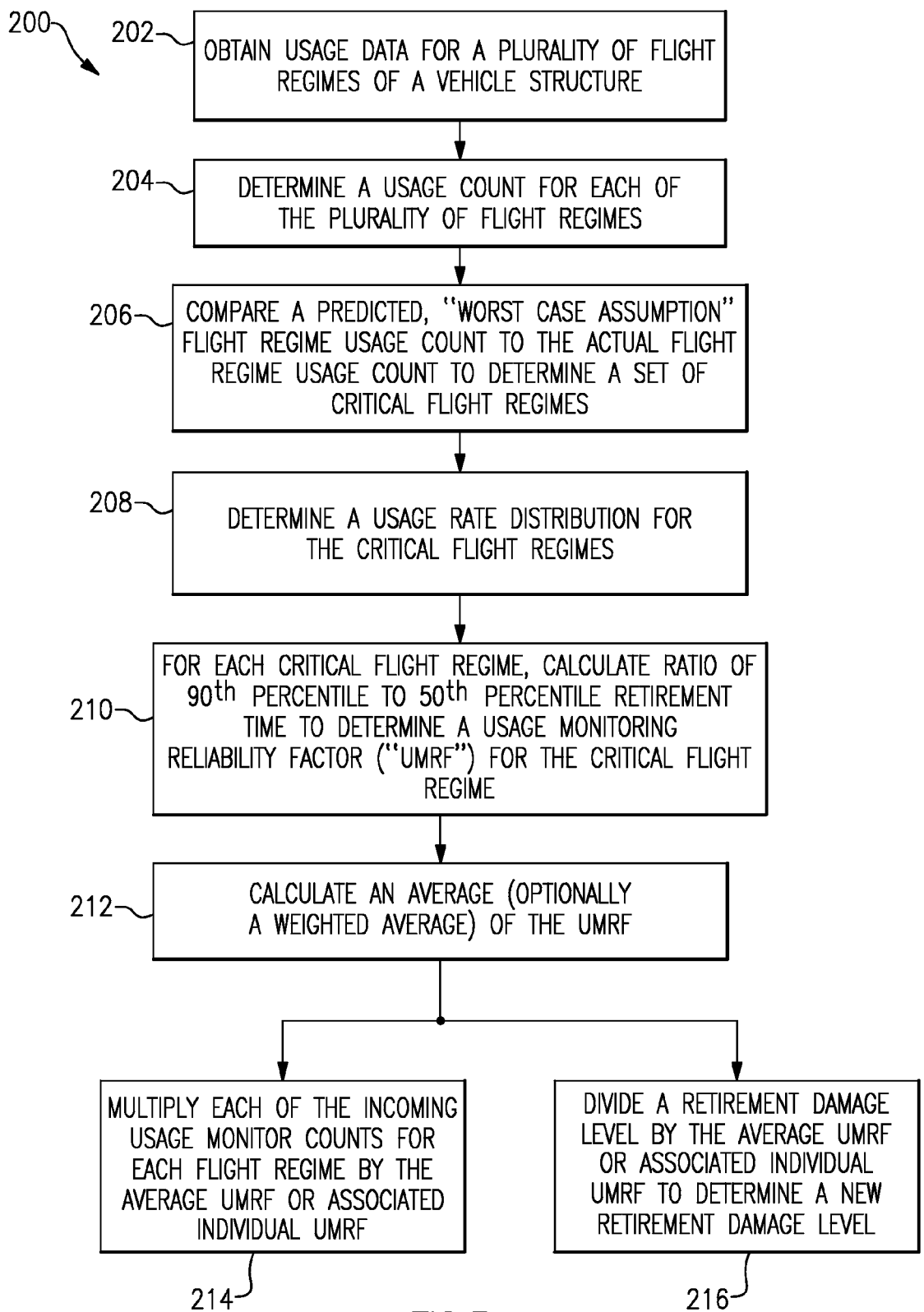
FIG. 3 schematically illustrates a method of updating a lifetime of a component in response to usage data.

FIG. 3 schematically illustrates a method 200 to add back the reliability nine by updating a lifetime of a component in response to usage data, such that actual usage data can be used while still achieving a "6-9's." The method 200 modifies Health and Usage Monitoring System ("HUMS") running usage or "damage" calculations by multiplying usage monitor counts by fixed component-specific reliability factors that are based on the likely statistical variations in that usage. Because the statistical variation in the usage of a specific aircraft is best described by the distribution of the usage for the entire fleet of the same type of aircraft, the fixed reliability factor or factors for any component can be determined from the known fleet variability in the rates of occurrence of its critical flight regimes.

Steps 202-212 of the method 200 identify how the factor or factors are calculated. Referring to FIG. 3, usage data is received for a plurality of flight regimes of a vehicle structure (step 202). One example vehicle structure is that of a rotary-wing aircraft, such as a helicopter, in which the usage data can be received from a Health and Usage Monitoring System ("HUMS") module 46 (see FIG. 4).

Figure 4:
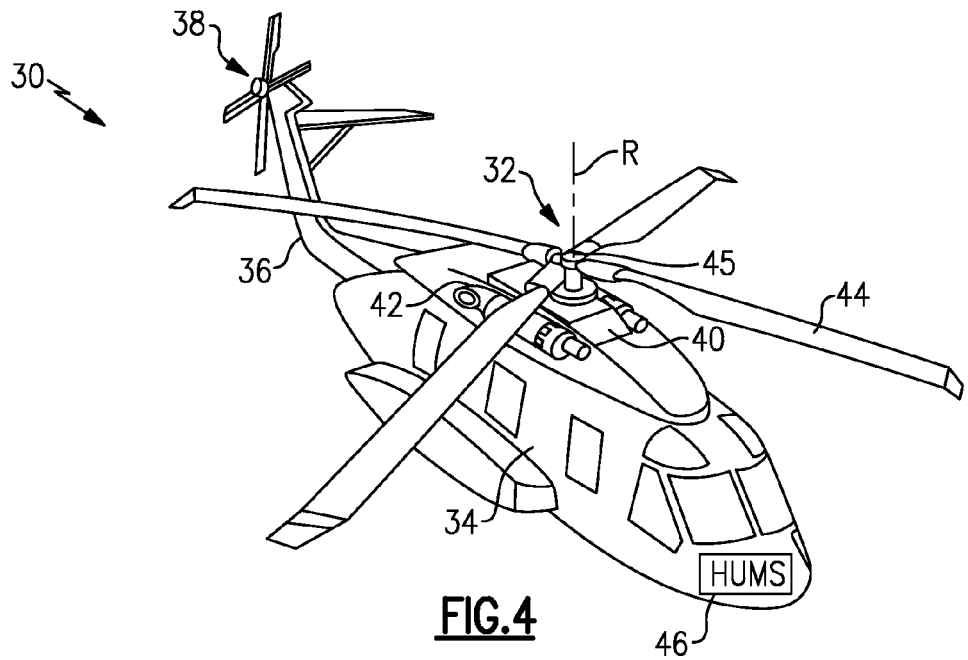
FIG. 4 schematically illustrates rotary-wing aircraft to which the method of FIG. 3 may be applied.

FIG. 4 schematically illustrates an exemplary rotary-wing aircraft 30 to which the method 200 may be applied. The aircraft 30 in the disclosed, non-limiting embodiment includes a main rotor system 32 supported by an airframe 34 having an extending tail 36 which mounts an anti-torque system 38. The main rotor assembly 32 is driven about an axis of rotation "R" through a main rotor gearbox ("MGB") 40 by a multi-engine powerplant system 42. The multi-engine powerplant system 42 generates the power available for flight operations and couples such power to the main rotor assembly 32 and the anti-torque system 38 through the MGB 40. The main rotor system 32 includes a multiple of rotor blades 44 mounted to a rotor hub 45 driven by a main rotor shaft. Although a particular helicopter configuration is illustrated and described in the disclosed embodiment, other configurations and/or machines, such as high speed compound rotary-wing aircraft with supplemental translational thrust systems, dual contra-rotating, coaxial rotor system aircraft, turbo-props, tilt-rotors tilt-wing aircraft and non-aircraft applications such as wind turbines will also benefit herefrom.

Figure 8:
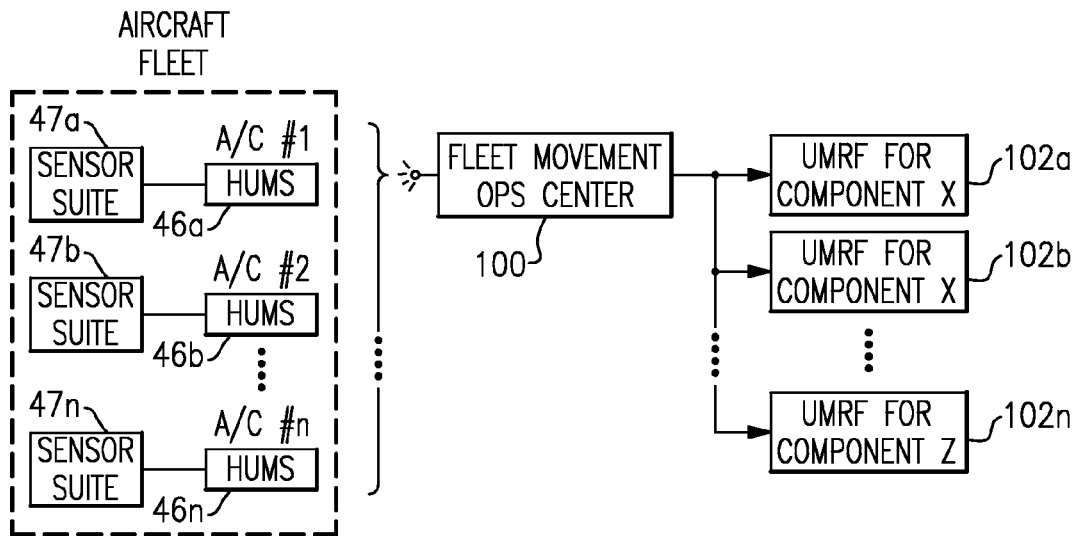
FIG. 8 schematically illustrates a usage data transmission configuration.

The aircraft 30 is equipped with a Health and Usage Monitor System ("HUMS") module 46 that records data for daily transmission to a Fleet Management Operations Center (see FIG. 8). Thus, in step 202 usage data may be received from the HUMS module 46.

Referring again to FIG. 3, a usage count is determined for each of the plurality of flight regimes of the aircraft 30 (step 204). A usage count could correspond to a quantity of times a transient operation occurred, or could correspond to a time duration of a longer maneuver, for example.

A predicted "worst case assumption" flight regime count is compared to an actual flight regime count from the usage data to determine a set of critical flight regimes (step 206). Step 206 can be illustrated using Table 1 below, which illustrates data for a fleet of 49 aircraft, with a fleet total of 163,000 flight hours.

TABLE 1

Assumed and Actual Centrifugal GAG Cycle Occurrence Rates

| | Occurrences in 100 Flight Hours | |
|---|---|---|
| Flight Regime | Worst Case Assumption | Fleet Average |
| GAG with Rotor Stop | | |
| (1) 0 to 105% NR | 171 | 18.0 |
| (2) 0 to 110% NR | 28 | 29.3 |
| (3) 0 to 115% NR | 1 | .03 |
| GAG without Rotor Stop | | |
| (4) 50 to 105% NR | 221 | 0.8 |
| (5) 50 to 110% NR | 28 | 1.6 |
| (6) 50 to 115% NR | 1 | 0 |
| Total | 450 | 49.7 |

Table 1 illustrates 6 flight regimes organized into 6 "bins" numbered 1-6. The regimes correspond to a Centrifugal Load Ground-Air-Ground ("GAG") cycle on the main rotor system 32 retention components, such as the main rotor hub 45. The abbreviation "NR" refers to a rotor speed of the main rotor assembly 32. Each variation in rotor speed is evaluated to determine if a countable GAG cycle occurs. For example, rotor speed dropping from the normal operating range but not below 50% NR (Ground Idle speed is 58% NR), and then increasing again, was counted as a 50% NR low end of a "GAG without Rotor Stop" cycle. Dropping below 50% was counted as 0% NR low end of a "GAG with Rotor Stop" cycle.

The high ends of the bins are for 105% NR, which is normal operating speed, and 110% and 115% NR which are included for autorotation conditions. Using these thresholds, each HUMS-counted GAG cycle is allocated to one of the 6 categories or "bins", the same 6 categories that are employed in the conventional damage calculation. It should be understood that any number of "bins" may alternatively be utilized. The sum of counts in each bin is divided by the aircraft total flight hours. This value is then expressed in terms of cycles in 100 hours. The resulting fleet average values for the 6 bins are shown in Table 1, along with the conventional life calculation worst case rates of occurrence per 100 flight hours.

Flight regimes that have a non-trivial rate of occurrence and will provide a contribution to the calculated retirement time (see indicator 12) are designated as "critical flight regimes" (step 206). As shown in Table 1, the ratio of fleet average (49.7) to worst case assumption (450) is approximately ⅑, such that the fleet is only experiencing ⅑$^{th}$ of the total CF GAG cycles assumed to occur in the conventional life calculation. Also, the "GAG without Rotor Stop" category (bins 4, 5 and 6) has very few entries, indicating that pilots actually do not routinely idle the rotor to the extent previously assumed.

The comparison of step 206 may include comparing a difference between predicted and actual CF GAG cycles to a threshold to determine if the difference is significant enough to be considered critical. As shown in Table 1, the difference for bins (2) and (3) is less than 2. However, the difference for bins (1) is greater than 150.

The comparison of step 206 may also include determining if the actual usage count is greater than the usage assumption. As shown in Table 1, for bin (2) the fleet average (29.3) is greater than the usage assumption (28). Thus, for the discussion that continues below, bins (1) and (2) are considered to correspond to critical flight regimes. However, it is to be understood that other thresholds and other criteria could be used to determine which flight regimes are critical.

Referring to FIG. 3, once critical flight regimes are determined, a usage rate distribution is determined for the critical flight regimes (step 208). The usage data for individual aircraft for bins (1) and (2) is compiled and shown in the 3-parameter Weibull plot 50 of FIG. 5. Only aircraft with more than 500 flight hours were included in FIG. 5, in order to avoid unrepresentative usage.

Figure 5:
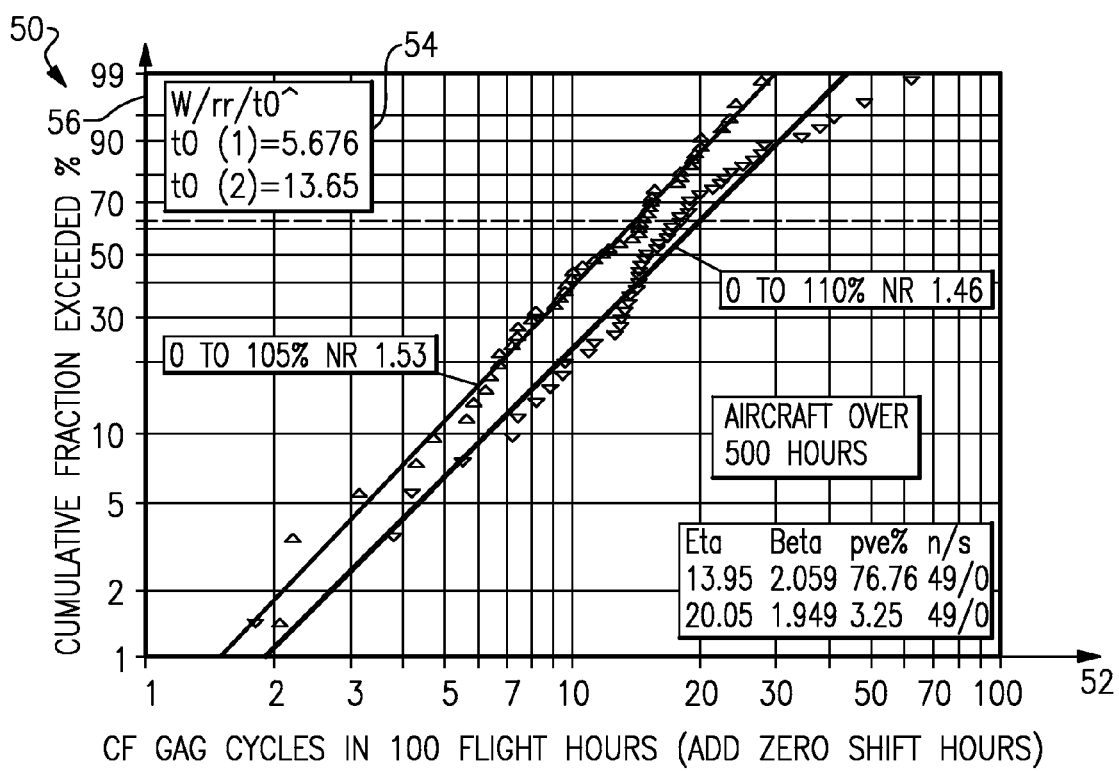
FIG. 5 is a 3-parameter Weibull plot that illustrates usage data for two flight regimes.

Because the Weibull plot 50 is a 3-parameter Weibull plot, the data has a "zero shift," meaning that all values on the time axis 52 must be increased by the zero shift values shown in the upper left (see box 54). Although at first glance the Weibull plot 50 may appear to indicate that some impossible values of usage could be inferred from summing the values on the chart, it is understood that adjacent data points on the plot 50 are likely from different lines are probably not from the same individual aircraft. The y-axis 56 on FIG. 5 is "Cumulative Fraction Exceeded, %" which is a typical label for the vertical axis of a Weibull plot. As an example, the x-axis 52 value associated with a point plotted at the 90th percentile level means that 90 percent of the members of the population will not exceed this value (i.e. only 10% will be at that level or higher). The Weibull plot is an accurate method to describe the characteristics of a "bell-shaped" statistical distribution as the percentages are relatively easy to pick off.

A Usage Monitoring Reliability Factor ("UMRF") is determined (step 210) in response to the Weibull plot 50. The Usage Monitor Reliability Factor ("UMRF") is proposed to be the ratio of the 90th percentile to the 50th percentile of the fleet rates of occurrence of the specific flight regimes that are critical in the damage calculation for each fatigue-substantiated component. For reasons that will be discussed below, this specific ratio can provide a 9 of reliability in the life axis, and can be employed as a simple multiplication factor to the usage monitor counts. Of course, it is understood that other ratios could be used in determining the UMRF. For example, one may wish to use other ratios if a more rational reliability allocation than the one associated with the conventional "6-9's" approach exists.

Thus, referring to the Weibull plot 50, a ratio of the 90$^{th}$ percentile to the 50$^{th}$ percentile of usage data for the critical regimes is calculated (step 210) to determine the UMRF for the critical flight regimes. To calculate the ratios, note that the 50$^{th}$ percentile of the 0 to 105% data is at 11.7 cycles in 100 hours on the plot, and adding the 5.7 cycles in 100 hours zero shift yields 17.4 cycles in 100 hours (slightly different from the 18.0 average value in Table 1 because it is a non-symmetric distribution). Note that the 5.7 value comes from the box 54 in the upper left corner of the graph 50. Using the same zero shift correction process for both distributions, ratios of 90$^{th}$ to 50$^{th}$ percentiles of 1.53 and 1.46 result.

An average of the UMRF for each critical flight regime is then determined (step 212). Since the two critical regimes produce similar factors of 1.53 and 1.46, a simple average is considered appropriate. Thus, a UMRF of 1.5 could be recommended rotor hub 26 of the analyzed fleet of aircraft based upon the data as shown in Table 1 and Weibull plot 50. Of course, it is to be understood that different components may have varying quantities of critical flight regimes, and thus may require performing a weighted average in step 212. Some regimes could be considered to be more or less relevant than other regimes in such a weighting algorithm. However, step 212 may be optional in that in some applications one may multiply individual usage counts for each flight regime by a specific UMRF determined for that flight regime, instead of multiplying every usage count by an average UMRF.

Thus, steps 202-212 may be performed to determine a UMRF, and the UMRF may then be applied to determine a revised component life. One way of applying the UMRF is to multiply each incoming usage monitor count by the UMRF to determine a usage value that includes the reliability margin 18 (step 214). That is, the HUMS running damage calculations may multiply the usage monitor counts of step 202 by the UMRF of step 212. In another embodiment, an additional or alternative way of applying the UMRF is to divide a retirement damage level (see indicator 12) by the UMRF to determine a new retirement damage level (step 216).

As discussed below, the steps 214, 216 enable a vehicle part to have a prolonged retirement time based at least in part upon actual usage data while still maintaining "6-9's" reliability, effectively re-gaining the margin 18 that is lost when incorporating usage data.

How UMRF Affects Retirement Time

Figure 6:
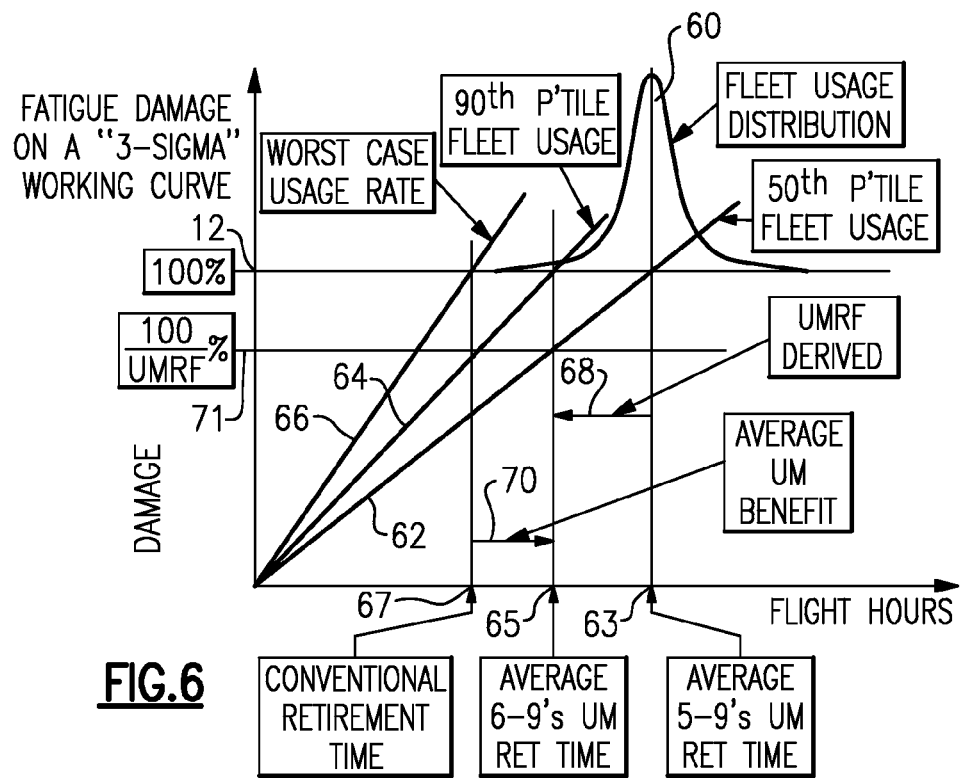
FIG. 6 is a graph that illustrates how a worst case usage assumption compares to actual usage data for a fleet of aircraft.
Figure 7:
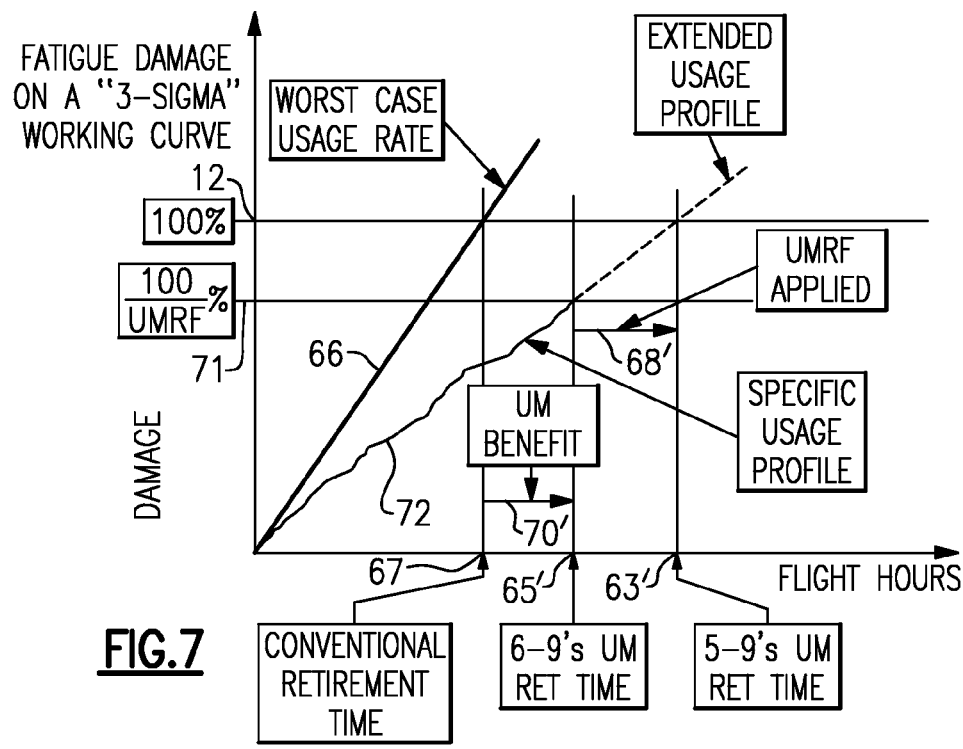
FIG. 7 is a graph that illustrates how a component retirement is affected by incorporating a Usage Monitor Reliability Factor ("UMRF").

FIGS. 6 and 7 are graphs showing how the UMRF affects retirement time, with FIG. 6 showing a fleet, and FIG. 7 showing a single usage.

FIG. 6 is a graph which show how the CWC worst case assumption 66 compares to actual usage data 72 for a fleet of aircraft as shown in fleet usage distribution 60. An average fleet usage 62 (i.e. 50$^{th}$ percentile) has a retirement time 63. At the 90$^{th}$ percentile (i.e. only 1 aircraft in 10 operates more aggressively) the fleet usage 64 has a retirement time 65 that is shorter than the retirement time 63, but is still more than the conservative CWC usage 66 having retirement time 67. Arrow 68 shows the margin between 50$^{th}$ and 90$^{th}$ percentile used to determine the UMRF. Arrow 70 shows a retirement time extension achieved for the aircraft fleet by using the UMRF. Indicator 71 shows a value of 100% divided by the UMRF (as described in step 116). Thus, as shown in the example of FIG. 6, to determine a new component retirement time using the UMRF, either the flight hour time along the horizontal axis can be reduced, or the retirement time along the vertical axis can be reduced.

FIG. 7 is a graph that illustrates how the component retirement time (see indicator 12) occurring when the HUMS running damage calculation, multiplied by the UMRF, reaches 100% (see retirement time 65'). Alternatively the damage calculation could employ the actual usage and retire when the total damage reaches a value of 100% divided by the UMRF (see indicator 71, and step 216). Note what happens in FIG. 7 if the measured usage profile were equal to or more severe than the Worst Case usage assumption. A retirement time less than the conventional retirement time results because of the UMRF. This may seem counter-intuitive since it is said that the conventional retirement time (indicator 12) protects even the worst case user. However, the conventional retirement time still provides protection in this case, but with a reduced reliability.

As shown in FIG. 7, by applying the UMRF, the retirement time of the aircraft is extended from time 67 to time 65' (see arrow 70' for magnitude of extension). New retirement time 65' is shorter than the "5-9's" retirement time 63' that is based only on usage. By using the UMRF, retirement time is extended to the time 65', and "6-9's" is achieved. In this example then, there is a retirement time increase for an average user, even when the UMRF is imposed. The UMRF is shown as a reduction in the allowable Flight Hours (see 65'), but can also be shown as a reduction in the allowable damage in the running component life calculation (see 71).

The availability of the compiled Structural Usage Monitor data (step 202) from an entire fleet of the same type of aircraft can be used to determine statistical distributions of the rates of occurrence of critical flight regimes can be constructed. This will now be discussed in the context of an aircraft HUMS application.

HUMS Configuration

As discussed above, Table 1 shows usage data for a fleet of aircraft, and FIG. 4 schematically illustrates an exemplary aircraft 30. Each aircraft 30 in the helicopter fleet is equipped with a Health and Usage Monitor System 46 (see FIG. 4), which records usage data using a sensor suite 47. Of course, it is possible that usage data could be recorded using other sensors. A plurality of HUMS modules 46a-n record and transmit usage data daily to the Fleet Management Operations Center 100 (illustrated schematically in FIG. 8). The Fleet Management Operations Center 100 processes the usage data to allow determination of the UMRF for a variety of components of the aircraft.

Figure 9:
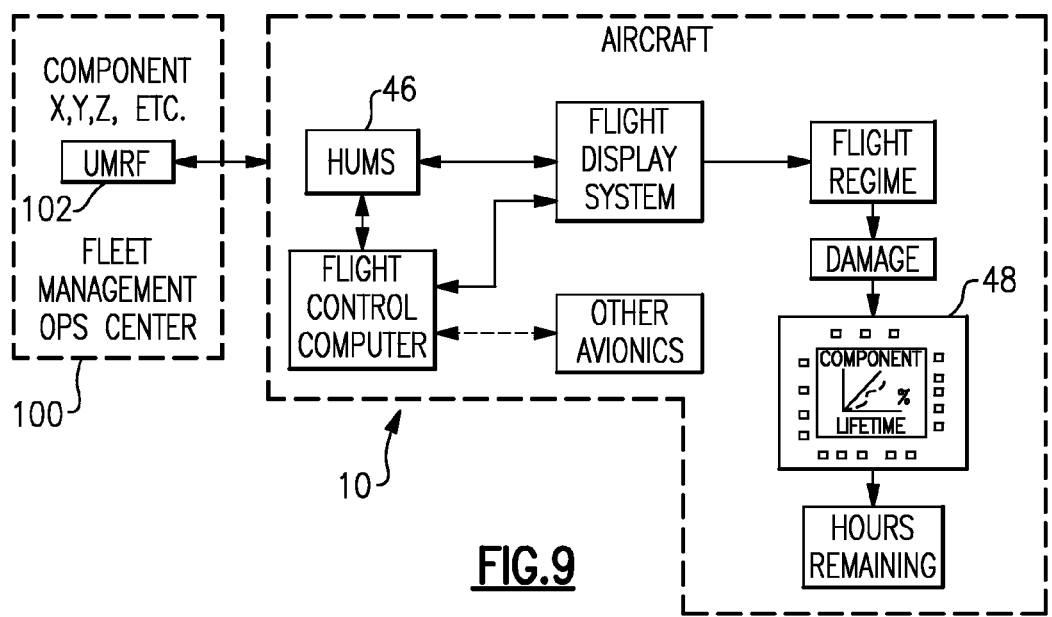
FIG. 9 schematically illustrates other aspects of the usage data transmission configuration of FIG. 8.

Referring to FIG. 9, the UMRF 102 for the main rotor hub 45 in the disclosed example and every other UMRF for respective other flight critical components may be downloaded into a module such as the HUMS module 46 which may operate as an interface with the flight computers and avionics on the aircraft. The HUMS module 46 may then use the UMRF to determine and display (see display 48) a modified lifetime for each flight critical component. In one non-limiting embodiment, the modified lifetime may be displayed as a percentage of remaining (modified) lifetime for that aircraft at that moment in time. The onboard calculation may be a "damage" calculation which is related to the flight regime and the flight hours for that aircraft at that moment in time.

The HUMS module 46 executes a usage monitoring algorithm (steps 202, 204). The functions of the algorithm are disclosed in terms of functional block diagrams, and it should be understood by those skilled in the art with the benefit of this disclosure that these functions may be enacted in either dedicated hardware circuitry or programmed software routines capable of execution in a microprocessor based electronics control embodiment. In one non-limiting embodiment, the module may be a portion of a flight control computer, a portion of a central vehicle control, an interactive vehicle dynamics module, a stand-alone line replaceable unit or other system.

The HUMS module 46 typically includes a processor, a memory, and an interface. The processor may be any type of known microprocessor having desired performance characteristics. The memory may, for example only, includes UVPROM, EEPROM, FLASH, RAM, ROM, DVD, CD, a hard drive, or other computer readable medium which stores the data and control algorithms described herein. The interface facilitates communication with other aircraft avionics and systems as well as facilitates communication with the Fleet Management Operations Center 100 through, for example, a wireless connection and/or through download. The Fleet Management Operations Center 100 is a ground-based computer located at a central location, and may include one or more computers.

It should be noted that a computing device can be used to implement various functionality, such as that attributable to the Fleet Management Operations Center 100 which may operate as a central repository for data from a multiple of aircraft fleets to determine the UMRF 102. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

The Regime Recognition capability of this HUMS installation is functional, and a complete usage data set may be compiled. Although the full validation needed to allow Regime Recognition to be used for retirement time credit may not be complete at this time. But there is one specific flight regime rate of occurrence that is directly recorded—the Centrifugal Load Ground-Air-Ground (GAG) cycle on the main rotor retention components such as the main rotor hub 45. This is because the rotor speed (NR) is directly measured and recorded without the use of software algorithms, and the CF load is directly and uniquely related to rotor speed. And one component, the main rotor hub 45, has 97% of its fatigue damage from the CF GAG cycles in its conventional retirement time calculation. The Conventional Retirement Time for this component is 4900 hours.

A Brief Review of Advanced Probabilistic Methodologies

The description below will provide a statistical proof for how the method 200 achieves an additional "9" by presenting a fatigue reliability assessment model ("FRAM") using advanced reliability methodologies to estimate the underlying reliability and evaluate the proposed Usage Monitoring Reliability Factor (UMRF).

Probabilistic methodologies have been applied in various engineering fields and industries for uncertainty quantification and associated risk management. In recent decades, increasing demands for better understanding the effects of variabilities and scatters in design, manufacturing, operation, and management triggers significant advancement of more robust and efficient probabilistic methodologies and further applications.

Figure 10:
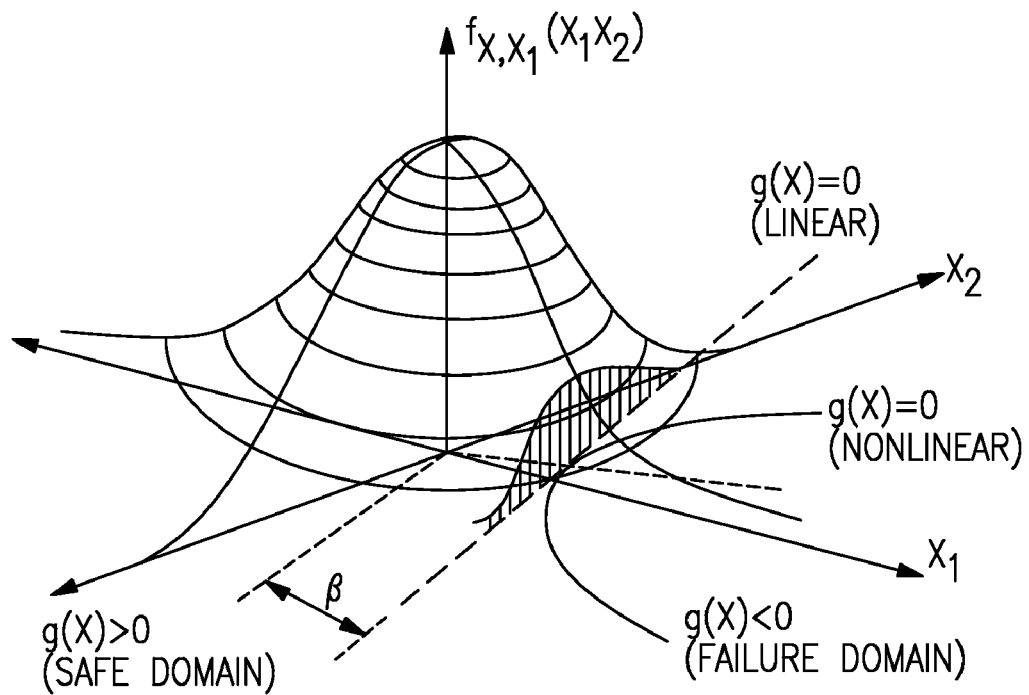
FIG. 10 is a graph that illustrates a limit state and joint probability density function.

In general, a reliability problem is defined by a so-called scalar performance function (also referred as limit state function) g(X) in an n-dimensional space where g(X)<0 denotes the failure domain F. As shown in FIG. 10, the vector of random variables X is characterized by a joint probabilistic density function $f_x(x)$. The associated probability of failure, $p_F$, can be estimated by equation #1 shown below.

$$p_F = \int_{g(X)} f_x(x)dx = \int_{R^n} I_F(x) f_x(x) dx \qquad \text{equation \#1}$$

where
$p_F$ is a probability of failure;
g(X) is a scalar performance function;
$f_x(x)$ is a joint probabilistic density function;
$I_F(x)$ is an indicator function of the failure domain F (see FIG. 7); and
$R^n$ is a n-dimensional real space.

Among the procedures developed for the structural reliability assessment and failure probability prediction, a prominent position is held by the simulation methods. The Monte Carlo simulation technique, as the basis of all simulation based techniques, is the most widely applied numerical tool in probabilistic analysis. The associated probability of failure estimate, $\hat{p}_F$, can be expressed as shown in equation #2 below.

$$\hat{p}_F = \frac{1}{N}\sum_{i=1}^{N} I_F(x^{(i)}), \qquad \text{equation \#2}$$

$$x^{(i)} \, i.i.d. \sim f_x(x)$$

where
$\hat{p}_F$ is an estimated probability of failure;
N is a fatigue life (in million cycles); and
$x^{(i)}$ i.i.d. is an $i^{th}$ sample vector containing sampling data generated from independent and identically-distributed random variables.

The convergent rate of the Monte Carlo ("MC") estimator, in terms of mean square, is appropriately measured by the coefficient of variation ("CoV") of the estimated probability of failure, as shown by equation #3 below.

$$CoV_{MC} = \frac{\sqrt{\text{Var}[\hat{p}_F]}}{p_F} = \sqrt{\frac{(1-p_F)}{N p_F}} \qquad \text{equation \#3}$$

where
CoV is the coefficient of variation; and
MC is the Monte Carlo estimator.
$p_F$ is the probability of failure.

It is noted that the above equations are independent of dimensionality of the random vector X. The key benefit for Monte Carlo simulation is its easiness to understand and implement. It can provide an accurate prediction if the sample size for simulation is sufficiently large. The major disadvantage associated with Monte Carlo simulation is its inefficiency in estimating a small probability of failure due to the large number (roughly proportional to $10/p_F$) of samples needed to achieve an acceptable level of accuracy (CoV of 30% or lower). For probabilistic application to a rotorcraft structural problem, a target reliability of 6-9's is generally required. This means that the probability of failure is less than or equal to $10^{-6}$ within the lifetime of the component. Therefore, 10 million simulation samples are usually required to provide an acceptable estimator of failure probability.

In addition to the Monte Carlo simulation techniques, several emerging methodologies for reliability analysis have been developed in the last three decades. The fast probability integration ("FPI") methodologies, including (1) first order reliability methods ("FORM"); (2) second order reliability methods ("SORM"); and (3) other hybrid methods (such as Importance Sampling), have been developed as effective alternates for fast probability assessment without compromising the accuracy of the results.

The FORM converts a multi-dimensional integration problem into a constrained linear stochastic optimization. In FORM, an iterative procedure is employed to find global minimum from the limit state surface to the origin of physics space using linear approximation of the limit state. For the case of a linear limit state function with Gaussian variables, FORM leads to an exact solution. If the limit state function becomes nonlinear or non-normal random variables are encountered, the accuracy and efficiency of FORM needs to be further improved.

The Second order reliability method (SORM) was developed to address the aforementioned concern. It approximates the limit state function by an incomplete second order polynomial with the assumption of maintaining the rotation symmetry requirement. It has been proven mathematically that SORM asymptotically provides sufficiently accuracy for large β values. This implies SORM is a good candidate for a small failure probability prediction, as generally required in the rotorcraft industry.

The Importance Sampling technique is another attractive alternative. It has been regarded as one of the most prevalent approaches in the context of simulation-based methods for probabilistic analysis. Instead of drawing random samples arbitrarily as implemented in a Monte Carlo simulation, the Importance Sampling approach focuses on the region that contributes the most of failure points along the limit state surface. The important region can be identified by either MPP obtained through FORM or SORM solution or the prior estimate from pre-sampling. In general, the efficiency of Importance Sampling technique improves significantly with a large reduction of the variance of estimator, once the appropriate Importance Sampling density function is identified.

Figure 11:
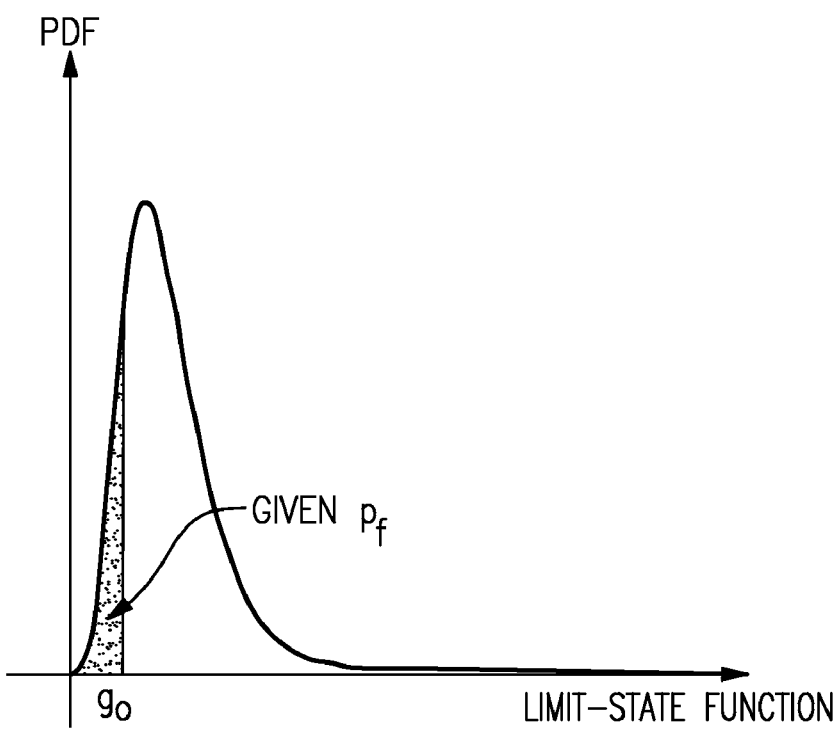
FIG. 11 is a graph that illustrates a notional sketch of inverse reliability analysis.

In reliability analysis, the probability of failure (as a measure of reliability) is evaluated at a prescribed value for a defined limit function with supporting statistical characterization of the uncertainty involved. Very often, we are encountering applications considering a problem with a limit state function involving one unknown parameter. We seek to determine the unknown parameter such that a prescribed reliability index or threshold level of probability of failure is attended, as depicted in FIG. 11. As shown in FIG. 11, given a known $p_f$, one can inversely determine $g_o$.

In theory, this type of problem can be solved iteratively by either repeating FORM/SORM analyses with varying θ until $\beta=\beta_T$, or a large sample Monte Carlo simulation covering the problem domain with desired accuracy. Clearly, the aforementioned approaches are tedious and often impractical. A direct and more efficient solution is proposed by Der Kiureghian and Zhang in the paper entitled "Inverse Reliability Problem," published in the ASCE Journal of Engineering Mechanics, Vol. 98, No 1, pp. 1-16, 1994.

Development of an Advanced Fatigue Reliability Assessment Model ("FRAM")

As discussed earlier, the safe-life approach has been widely applied in the industry for fatigue design and substantiation. For the case under constant amplitude load, the safe-life approach can be expressed via a standard S-N relationship, such as shown in equation #4 below.

$$\frac{S}{S_E} = 1 + \frac{\beta}{N^\gamma} \qquad \text{equation \#4}$$

where
S is an applied vibratory stress;
$S_E$ is an endurance limit representing a threshold below which no fatigue initiation may be expected; and
β and γ are shape parameters.

Fatigue strength parameters, β, γ, and $S_E$, may be obtained through statistical analysis of fatigue test data.

In general, due to various usage and mission profiles, the vibratory load applied on rotorcraft dynamic structures exhibit variable amplitude nature. To properly account for cumulative damage under different usage profiles, the Miner's rule may be employed. In case of M flight regimes and K different cycles per each regime, cumulative damage per fixed time $t_0$, can be calculated as $$\tilde{d}_{t0} = \sum_{m=1}^{M} \sum_{k=1}^{K} \left\{ \frac{\tilde{n}_{mk}}{\tilde{N}(\tilde{S}_{mk})} \right\} \qquad \text{equation \#5}$$

$$\tilde{S}_{mk} = \tilde{U}_m \tilde{L}_m \tilde{z}_{mk} \qquad \text{equation \#6}$$

$$\tilde{n}_{mk} = (\overline{\omega}_m t_0) \tilde{U}_m \tilde{C}_{mk} \qquad \text{equation \#7}$$

where
M is a quantity of flight regimes;
K is a quantity of cycles per regime;
Ñ is the calculated number of cycles for the m-th flight regime at the k-th bin;
$\tilde{S}_{mk}$ is the peak load for the m-th flight regime at the k-th bin;
$\tilde{U}_m$ is the percentage usage contribution of the m-th flight regime;
$\tilde{L}_m$ is the peak load(s) associated with the m-th flight regime;
$z_{mk}$ is a portion of peak load associated with the m-th flight regime at the k-th bin;
$\tilde{n}_{mk}$ is the actual number of cycles for the m-th flight regime at the k-th bin;
$\overline{\omega}_m$ is a basic frequency;
$t_0$ is a fixed time; and
$\tilde{C}_{mk}$ is the cycle count for the m-th flight regime at the k-th bin.

Therefore, assuming that lifetime t is much longer than $t_0$, and suggesting the same usage spectrum distribution during the entire life, a random damage distribution $\tilde{d}_t$ can be defined as follows:

$$\tilde{d}_t = (t/t_0)\tilde{d}_{t0} \qquad \text{equation \#8}$$

Fatigue failure is assumed to occur when the total cumulative damage exceeds 1. Therefore, the probability of failure due to the excessive cumulative fatigue damage in a specified time t, can be calculated as the following probability:

$$p_F = P(\tilde{d}_t > 1) = P\lfloor (t/t_0)\tilde{d}_{t0} > 1 \rfloor \qquad \text{equation \#9}$$

As discussed in the earlier sections, there are three major sources of uncertainty that significantly contribute to the scatter of fatigue life, including variation of usage, scatter associated with applied load, and inherent randomness of the fatigue endurance limit. The statistical models describing variability for usage, load, and fatigue strength can be established through analysis of fielded usage, flight loads testing, and laboratory fatigue testing.

The aforementioned fatigue damage accumulation model, as defined via equations #4-9, has been further implemented as a user-defined limit state function. The potential random variables are allocated in the limit state and their statistical models (in terms of type of statistical distribution, associated distribution parameters, and correlation/covariance structure) are defined in an input file, along with the user-specified options for method selection, accuracy, convergence control, and target sample size.

The advanced probabilistic methodologies have been applied to the safe-life approach as the means to estimate the underlying structural reliability. The new approach for fatigue reliability assessment has been studied extensively previously (see (1) Ditlevsen, O. and Madsen H. O., Structural Reliability Methods, 1996, (2) Zhao, J. and Haldar, A.

Reliability-based Structural Fatigue Damage Evaluation and Maintenance Using Non-destructive Inspections. Haldar A, Guran A, Ayyub B M. Uncertainty Modeling in Finite Element, Fatigue and Stability of Systems. World Scientific, New York, 1997. p. 159-214). Also, numerical efficiency and accuracy of the advanced probabilistic methods have been performed via an AHS Fatigue Reliability Round Robin case. The outcomes of the study fully justifies the advanced probabilistic methods are numerically accurate and efficient for fatigue reliability applications.

Evaluation of the FRAM Model Using an Existing Fatigue Reliability Study

As a "calibration", the FRAM model was used to estimate the reliability of the a Main Rotor Shaft. The conventional fixed retirement time for this early configuration shaft was 1000 hours. The reliability study used a simple, but cumbersome, Monte Carlo approach with the established laboratory fatigue strength, a flight loads survey, and a full usage spectrum of 178 flight regimes. The scatter associated with each regime is represented by a random usage percentage and an associated random flight load. Cycle counts were applied to place peak loads into up to 4 bins. The variability associated with the mean fatigue endurance limit is also considered as a random variable with a CoV of 10%. In total there were 357 random variables considered in this study. The result was that a reliability slightly higher than 6-9's was estimated for the 1000 hour conventional retirement time.

The FRAM probabilistic fatigue analyses were performed at a specified life achieving the notional "6-9s" reliability. FORM and SORM were employed to determine the probability of failure. IS with 200,000 samples and 11 million samples of BMC (Monte Carlo) were also applied for additional verification. The results are summarized in Table 2 below.

The FRAM estimate of the shaft reliability for the 1000 hour life is 0.999998, or $9_s 8$ ($2 \times 10^{-6}$ probability of failure) and results obtained from various algorithms in general agree very well. The FORM solution predicts failure probability of $1.79 \times 10^{-7}$, which is one magnitude lower than the follow-on SORM analyses. The underestimation is attributed to a high nonlinear behavior exhibited in this particular case, which causes a further challenge to the basic assumption of hyperplane approximation for the limit state used in the FORM algorithm. Follow-on SORM provides further correction by incorporating information of main curvature and contribution from high orders. The results are significantly improved. The results obtained from IS and BMC agree with the SORM predictions. In this case, the curvature fitting approach employed in the first three SORM algorithms outperforms the ones using point fitting options.

TABLE 2

Comparison of Results of Shaft Probabilistic Fatigue Analyses

| Method | Rel Index | Pf | CoV_pf |
|---|---|---|---|
| FORM | 5.09 | 1.79E-07 | N/A |
| SORM_CurvFit_Breitung | 4.6711 | 1.50E-06 | N/A |
| SORM_CurvFit_impBreitung | 4.6533 | 1.63E-06 | N/A |
| SORM_CurvFit_Tvedt | 4.6776 | 1.45E-06 | N/A |
| SORM_PointFit_Breitung | 4.7116 | 1.23E-06 | N/A |
| SORM_PointFit_impBreitung | 4.6952 | 1.33E-06 | N/A |
| SORM_PointFit_Tvedt | 4.7167 | 1.20E-06 | N/A |
| IS_200K | 4.6018 | 2.09E-06 | 1.52E-02 |
| BMC_11M | 4.5847 | 2.27E-06 | 6.32E-02 |

Figure 12:
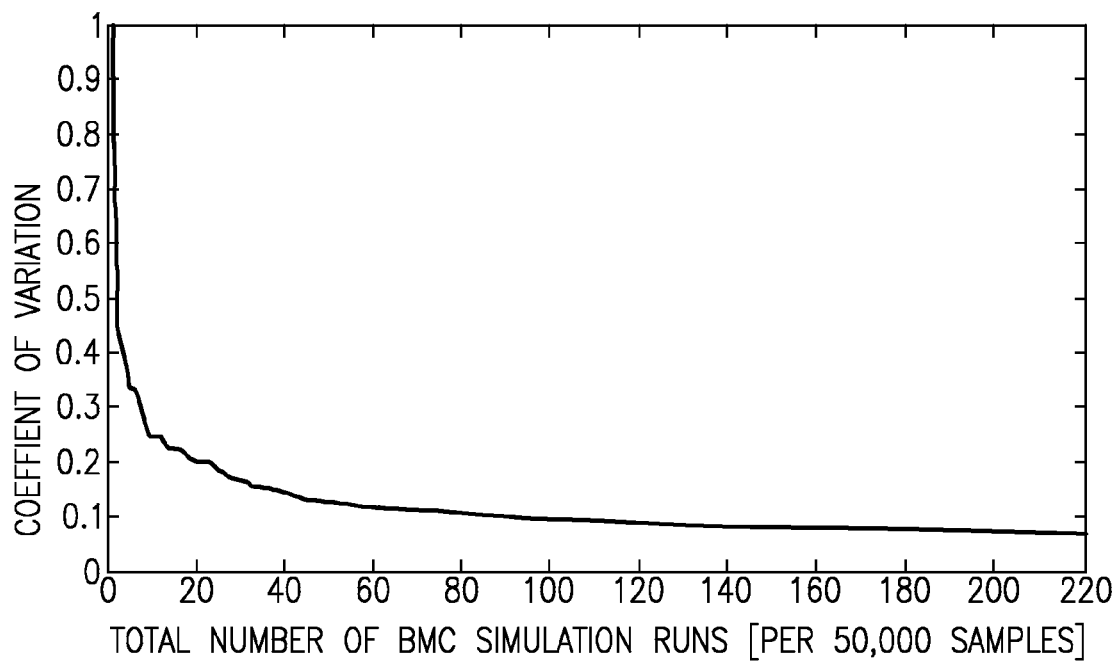
FIG. 12 is a graph that illustrates a plot convergence for a prediction as a function of sample size.

It is important to reinforce our previous discussion on the convergence issue associated with a Monte Carlo simulation, as defined in equation #3. As depicted in FIG. 12, the error of the predicted probability of failure (in terms of CoV of the prediction) drops significantly at the beginning when the sample size increases. After it reaches the 25% mark using 100,000 samples, the rate of convergence starts to decay. The CoV can be further reduced to 12% if 500,000 samples are used. Finally, the CoV of 6.28% is achieved after 11 million samples, which takes more than one hundred hours to run. Using Importance Sampling, the efficiency of simulation has been significantly improved. In one example the simulation took an hour and half running time and achieved the same level of the estimated probability of failure with higher accuracy.

The results obtained from SORM, IS and BMC agree with the findings by Thomson and Adams in their earlier study (see Thompson, A. E., and Adams, D. O., "A Computational Method for the Determination of Structural Reliability of Helicopter Dynamic Components," 46th Annual Forum of the American Helicopter Society, Washington, D.C., May 1990), in which the same data set had been used to demonstrate the notional 6-9s reliability approach.

Retirement Time Assessments of the Main Rotor Hub

1) Reliability Assessment Using the FRAM

Probabilistic fatigue analysis was conducted first to determine a baseline reliability for the conventional damage calculation. It is somewhat simpler than the Main Rotor Shaft evaluation, with thirteen random variables (RVs) considered, including six usage-related cycle counts, six corresponding loads, and the fatigue endurance limit. Following the assumptions made previously (see Thompson, A. E. and Adams, D. O., "A Computational Method for the Determination of Structural Reliability of Helicopter Dynamic Components," $46^{th}$ Annual Forum of the American Helicopter Society, Washington, D.C., May 1990), the usage distribution is described in terms of a Weibull distribution with slope of 2.0. It is further assumed that the composite worst case values listed in Table 1 represent the 90th percentile (1-9) of the entire distribution. Knowing this, the parameter for the Weibull distributed variable can be determined by equation #10 shown below.

$$\gamma = \frac{x_{90}}{\{-\text{Ln}[\text{Ln}(1 - F_X(x_{90}))]\}^{\frac{1}{\beta}}} \quad \text{equation \#10}$$

where $x_{90}$ is the 90th percentile of the subject distribution.

The coefficient of variation (CoV) for a two-parameter Weibull distribution depends solely on its Weibull slope parameter, such as $$\text{CoV} = \frac{\sigma}{\mu} = \frac{\left[\Gamma\left(1 + \frac{2}{\beta}\right) - \Gamma\left(1 + \frac{1}{\beta}\right)^2\right]^{\frac{1}{2}}}{\Gamma\left(1 + \frac{1}{\beta}\right)} \quad \text{equation \#11}$$

where

σ is the standard deviation of the distribution;

μ is the mean value of the distribution; and

Γ is an incomplete Gamma function.

Therefore, the Weibull slope of 2.0 yields the corresponding CoV of 52.28%, representing a large amount of scatter.

Similarly, a Weibull distribution has been used for loads with slope of 5.0 and the $99^{th}$ percentile (2-9's) is assigned to the maximum measured flight loads for each regime. A Normal distribution is used to describe the fatigue strength with the mean value as determined by laboratory test and a CoV of 10% ("3-9's").

Using the conventional retirement time of 4900 hours, the probability of failure is predicted using FORM, SORMs, Importance Sampling with 100,000 samples, and basic Monte Carlo simulation with up to 5 million samples. The results are summarized in Table 3 for further comparison.

TABLE 3

Comparison of Results of Baseline Probabilistic Fatigue Analyses

| Method | Rel Index | Pf | CoV_pf |
|---|---|---|---|
| FORM | 4.3484 | 6.86E−06 | N/A |
| SORM_CurvFit_Breitung | 4.382 | 5.88E−06 | N/A |
| SORM_CurvFit_impBreitung | 4.3831 | 5.85E−06 | N/A |
| SORM_CurvFit_Tvedt | 4.3835 | 5.84E−06 | N/A |
| SORM_PointFit_Breitung | 4.3815 | 5.89E−06 | N/A |
| SORM_PointFit_impBreitung | 4.3827 | 5.86E−06 | N/A |
| SORM_PointFit_Tvedt | 4.3831 | 5.85E−06 | N/A |
| IS_100K | 4.3653 | 6.35E−06 | 1.86E−02 |
| BMC_5000K | 4.3635 | 6.40E−06 | 1.77E−01 |

It can be observed that the FORM solution accurately predicts failure probability and matches well with the solutions obtained from other methods, including IS and BMC.

The predicted probability of failure at the conventional retirement time of 4900 hours is $6.68 \times 10^{-6}$, which is a reliability of 0.999993, or $0.9_5 3$. This value is somewhat less than 6-9's, although it is within the range expected for this statistical evaluation. Reliability values between 5 and 7 nines have been seen in many other evaluations of this type, and all are considered to meet the goal of providing approximately 6-9's of reliability. Reliability prediction is largely impacted by the distribution behavior at the tails with extreme statistics. In general, physical verification of this behavior is extremely difficult. Any reliability analysis must be evaluated considering the assumptions and approximations made in model building and computing, as well as potential unknown unknowns. Therefore, a reliability prediction may not have absolute meaning and its greatest value is in making relative comparisons.

The monitored fleet usage distributions for the two critical flight regimes for the main rotor hub 45 are shown in FIG. 5. These distributions are directly substituted for the CWC usage assumption in a new FRAM inverse reliability analysis and the results are shown in FIG. 12.

Figure 13:
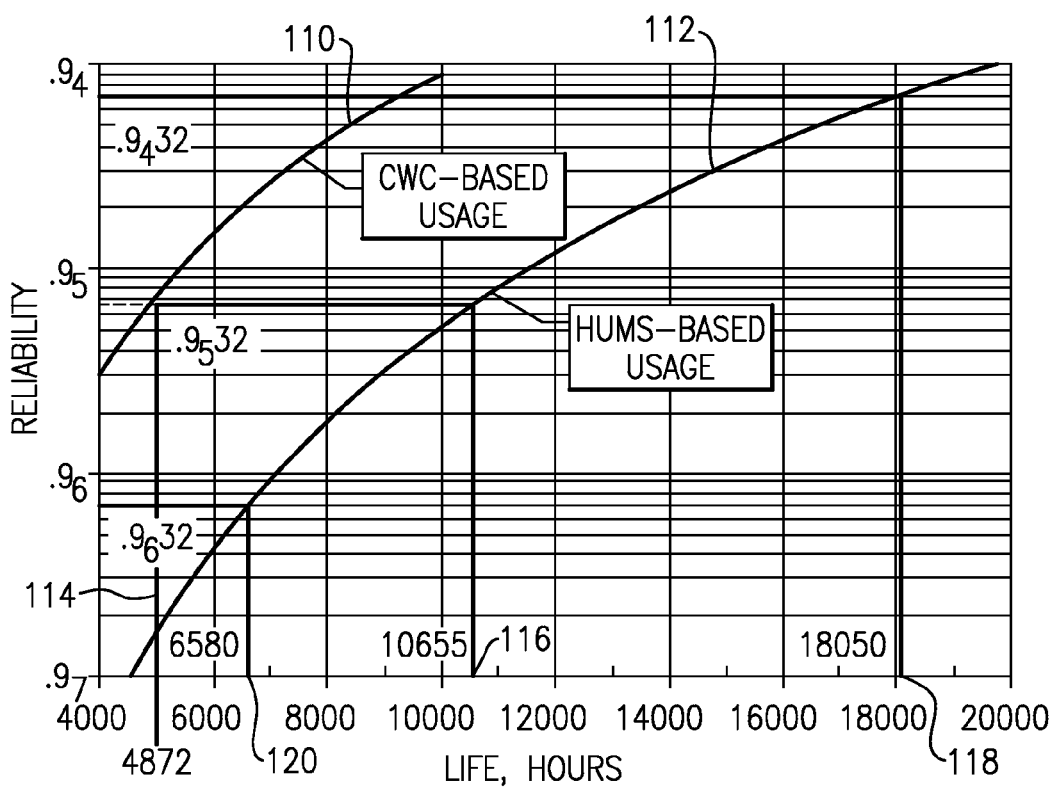
FIG. 13 is a graph that illustrates a reliability of an aircraft component for worst case assumed usage and for actual usage.

The upper line 110 in FIG. 13 shows the reliability of the hub based on the CWC usage assumption that is discussed above. This has the intercept of 0.999993 reliability at the conventional retirement time of 4,900 hours (see indicator 114). The lower line 112 shows the reliability of the hub based on the HUMS-recorded usage for the exemplary aircraft fleet. 3 intercepts are highlighted—10,700 hours (see indicator 116) at the same baseline reliability as the CWC conventional retirement time, 18,000 hours (see indicator 118) with 1-9 less reliability, and 6,600 hours (see indicator 120) with 1-9 additional reliability.

So, on a reliability basis, 10,700 hours hub retirement time (see indicator 116) for an average user of the aircraft 30 provides the same safety margin that was built in to the 4,900-hour conventional retirement time with its worst case usage assumption.

2) Usage Monitor Calculation with 1.5 UMRF

A hub usage monitor damage calculation for the average user of the aircraft 30 may employ the counts shown in Table 1—For the 0 to 105% category, 18.0 cycles in 100 hours; for the 0 to 110% category, 29.0 cycles in 100 hours. These are the only two GAG categories with significant entries and the values shown have no correction for reliability. There is a small contribution in the hub damage calculation due to bending, amounting to a damage rate of 0.0007 in 100 hours. The damage calculation also uses 13,000 cycles as the allowable value on the 3-sigma working curve for the 0 to 105% GAG entry, and 7,000 allowable cycles for the 0 to 110% GAG entry. These amount to 18/13,000 or 0.0014 damage in 100 hours, and 29/7000 or 0.0041 damage in 100 hours. Adding the bending yields a total of 0.0062 in 100 hours, and a retirement time of 100/0.0062, or 16,100 hours. This value does not contain any usage margin, and can be compared to the 18,000-hour result shown in FIG. 12.

Next the 1.5 UMRF factor proposed for the main rotor hub 45 is applied to the data in Table 1. This changes the two values to 27.0 and 43.5 GAG cycles in 100 hours. Using the same allowable cycles yields 27/13,000, or 0.0021, and 43.5/7000, or 0.0062 damage in 100 hours. Adding the 0.0007 for bending yields a total damage of 0.0090 and a retirement time of 11,100 hours. This is the retirement time that may result from usage monitoring an average user of the aircraft 30, with the reliability factor included. It compares very well with the 10700 hours shown by the FRAM analysis for the same condition. In fact, using the practice of reporting retirement times to only two significant figures, they are the same.

The conclusion from this comparison is that the 1.5 UMRF chosen for the main rotor hub 45 of the aircraft 30 based on a fleet usage distribution produces the desired effect of maintaining the same reliability with usage monitoring that is provided by the conventional calculation. This result applies even with a significant extension of the retirement time, or a significant reduction.

Implementation of UMRF Methodology

The single UMRF of 1.5 derived for the main rotor hub 45 will not necessarily apply to other components or other aircraft models because each will have a different set of critical flight regimes. It would be most convenient if one universal UMRF factor could be conservatively applied to all, but such an outcome is not expected. The factors, which may be different for different flight regimes as well as for different components, cannot be firmly established until a representative sample of the fleet usage distribution is obtained. Until that time, the fleet can be maintained with the conventional retirement times. When the factors are established, and a usage monitored component retirement program implemented, all of the components in service will require a new damage calculation using the stored records of their individual usage compilations.

The validity of UMRF factors established relatively early in the service life of the fleet should be periodically checked. New factors can easily be established if needed because the entire body of usage for the fleet is readily available for a new analysis. If the factors change, however, all of the affected cumulative damage calculations must be redone. While this is again just a routine computer calculation task, the impact on the management of the fleet logistics could potentially be significant. A frequent evaluation of the UMRF factors—once a year, for example, is useful to reduce this potential impact.

It is understood that the idea of a component on one aircraft having its retirement time damage rate adjusted because of what is happening on other aircraft is difficult to explain. However, the changes are expected to be relatively small, and the explanation should always be that the safety margin that we provide must be maintained. Additional verifications of the new UMRFs are recommended using the FRAM methodology.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

It should also be understood that although a ratio of 90th to 50th percentile of usage data values was described in relation to determining the URMF, it is understood that other ratios could be used, and that the ratio of 90th to 50th percentile is only one example ratio pertinent to the currently used conventional "6-9's" reliability allocation.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art may recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method comprising:
   accessing flight regime rates of occurrence distributions associated with one or more flight regimes for a fleet of aircraft, the one or more flight regimes are one or more predicted maneuvers performed during a flight; and
   determining, using the accessed flight regime rates of occurrence distributions, a factor for at least one of the flight regimes that provides a predetermined amount of reliability for a component on each aircraft on the fleet of aircraft known to be affected through at least fatigue damage by the at least one flight regime.

2. The method as recited in claim 1, wherein the occurrence distributions include a plurality of usage counts, the method further including:
   multiplying the plurality of usage counts of the component by the factor.

3. The method as recited in claim 1, the method further including:
   dividing a retirement damage level for the component by the factor.

4. The method as recited in claim 1, modifying a lifetime of the component for a selected one of the aircraft from the fleet in response to the factor.

5. The method as recited in claim 1, wherein said determining, using the accessed flight regime distributions, a factor for at least one of the flight regimes that provides a predetermined amount of reliability for a component on each aircraft on the fleet of aircraft known to be affected through at least fatigue damage by the at least one flight regime includes:
   A) identifying a critical flight regime from the occurrence distribution;
   B) determining a 90th percentile usage value for the critical flight regime in the occurrence distribution;
   C) determining a 50th percentile usage value for the critical flight regime in the occurrence distribution; and
   D) defining the factor as a ratio between the 90th percentile and 50th percentile usage values for the critical flight regime.

6. The method as recited in claim 5, wherein said determining, using the accessed flight regime distributions, a factor for at least one of the flight regimes that provides a predetermined amount of reliability for a component on each aircraft on the fleet of aircraft known to be affected through at least fatigue damage by the at least one flight regime further includes:
   E) selectively repeating steps (A)-(D) for each of a plurality of critical flight regimes; and
   F) defining the factor as a weighted average of factors for individual critical flight regimes.

7. The method as recited in claim 1, wherein said determining, using the accessed flight regime distributions, a factor for at least one of the flight regimes that provides a predetermined amount of reliability for a component on each aircraft on the fleet of aircraft known to be affected through at least fatigue damage by the at least one flight regime includes:
   determining a Weibull plot of the occurrence distribution for one of the flight regimes; and
   defining the factor for a selected critical flight regime as a ratio between a 90th percentile Weibull plot usage value and a 50th percentile Weibull plot usage value for the flight regime.

8. The method as recited in claim 1, wherein the distributions include a plurality of usage counts, the method further including:
   verifying that the factor achieves a required 0.999999 reliability.

9. The method as recited in claim 1, wherein the distributions include a plurality of flight usage counts, the method further including:
   determining component retirement life while maintaining a required 0.999999 reliability.

10. The method as recited in claim 1, wherein the one or more predicted maneuvers includes a turn performed during a flight.

11. The method as recited in claim 1, wherein the one or more predicted maneuvers includes a landing.

12. The method as recited in claim 1, wherein said determining of the factor includes identifying a critical flight regime from the occurrence distribution.

13. The method as recited in claim 1, wherein said determining of the factor includes determining a ratio between percentile usage values of a flight regime.

14. The method as recited in claim 1, wherein said determining of the factor includes:
   A) identifying a critical flight regime from the occurrence distributions;
   B) determining a first percentile usage value for the critical flight regime in the occurrence distribution;
   C) determining a second percentile usage value for the critical flight regime in the occurrence distribution; and
   D) defining the factor as a ratio between the first percentile usage value and the second percentile usage value for the critical flight regime.

15. A method comprising
   accessing flight regime rates of occurrence distributions associated with one or more flight regimes for a fleet of aircraft; and
   determining, using the accessed flight regime rates of occurrence distributions, a factor for at least one of the flight regimes that provides a predetermined amount of reliability for a component on each aircraft on the fleet of aircraft known to be affected through at least fatigue damage by the at least one flight regime, including:

A) identifying a critical flight regime from the occurrence distribution by comparing a usage assumption for a flight regime to an actual usage count for the flight regime and
identifying the flight regime as critical in response to an amount of fatigue damage contributed by the flight regime's occurrence rate to a calculation of component retirement time exceeding a predefined threshold, B) determining a 90th percentile usage value for the critical flight regime in the occurrence distribution, C) determining a 50th percentile usage value for the critical flight regime in the occurrence distribution, and D) defining the factor as a ratio between the 90th percentile and 50th percentile usage values for the critical flight regime.

16. A method performed by a computer either on-board an aircraft or remote from the aircraft, comprising:
receiving a usage monitoring reliability factor associated with a component on an aircraft, and the usage monitoring reliability factor is a ratio between percentile usage values of a flight regime;
multiplying aircraft usage cycles by the factor to determine adjusted usage data;
adjusting, using at least the factor, a lifetime of the component in response to the adjusted usage data; and
displaying the adjusted lifetime of the component.

17. A method comprising:
accessing flight regime rates of occurrence distributions associated with one or more flight regimes for a fleet of aircraft; and
determining, using the accessed flight regime rates of occurrence distributions, a factor for at least one of the flight regimes that provides a predetermined amount of reliability for a component on each aircraft on the fleet of aircraft known to be affected through at least fatigue damage by the at least one flight regime;
determining, using at least the factor, instructions to modify a lifetime of the component for a selected one of the aircraft from the fleet; and communicating the instructions to an entity configured to use the instructions to modify the lifetime of the component.

18. The method as recited in claim 17, wherein the instructions comprise signals on a computer readable medium configured to cause a computer on the selected aircraft to adjust a lifetime of the component by the factor.

19. The method as recited in claim 17, further comprising displaying indicia corresponding to the lifetime of the component to a user of the selected helicopter.

20. The method as recited in claim 17, wherein the instructions facilitate adjustment to the lifetime of the component.

21. The method as recited in claim 17, wherein the method is performed on a computer either on-board the aircraft or remote from the aircraft.

22. An apparatus comprising a computer configured through a non-transitory computer-readable storage medium to perform the operations of:
determining a fatigue reliability of an aircraft component in response to at least one of flight usage data, flight load data, historical data, and a fatigue reliability assessment model; and
using usage distributions to determine; a factor for at least one flight regime that provides a usage count adjustment for the component for each aircraft of a fleet known to be affected through at least fatigue damage by the at least one flight regime, and the at least one flight regime is one or more predicted maneuvers performed during a flight.

23. The apparatus as recited in claim 22, wherein the one or more predicted maneuvers includes a turn performed during a flight.

24. The apparatus as recited in claim 22, wherein the one or more predicted maneuvers includes a landing.

25. The method as recited in claim 16, wherein the flight regime is a predicted maneuver performed during a flight.

26. The method as recited in claim 16, wherein the lifetime of the component is divided by the factor to determine the adjusted lifetime of the component.

27. The method as recited in claim 16, wherein a current lifetime of the component is displayed as a percentage of the adjusted lifetime on an aircraft display system.

* * * * *